US008784207B2

(12) United States Patent
Ramaswamy et al.

(10) Patent No.: US 8,784,207 B2
(45) Date of Patent: *Jul. 22, 2014

(54) METHODS AND APPARATUS TO METER VIDEO GAME PLAY (71) Applicants: Arun Ramaswamy, Tampa, FL (US); John C. Peiffer, New Port Richey, FL (US)

(72) Inventors: Arun Ramaswamy, Tampa, FL (US); John C. Peiffer, New Port Richey, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/847,860

(22) Filed: Mar. 20, 2013

(65) Prior Publication Data

US 2013/0217499 A1 Aug. 22, 2013

Related U.S. Application Data (63) Continuation of application No. 12/023,844, filed on Jan. 31, 2008, now Pat. No. 8,430,752.

(60) Provisional application No. 60/936,390, filed on Jun. 20, 2007.

(51) Int. Cl.
A63F 9/24 (2006.01)
A63F 13/00 (2014.01)
H04N 21/441 (2011.01)
A63F 13/02 (2006.01)

(52) U.S. Cl.
CPC ............ A63F 9/24 (2013.01); A63F 2300/1043 (2013.01); H04N 21/441 (2013.01); A63F 13/02 (2013.01)
USPC .................... 463/37; 463/36; 463/46; 463/47

(58) Field of Classification Search
USPC ............................................................ 463/37
See application file for complete search history.

(56) References Cited

U.S. PATENT DOCUMENTS 4,004,097 A 1/1977 Spaulding
4,352,104 A 9/1982 Mizuta et al.
(Continued)

FOREIGN PATENT DOCUMENTS

EP 1759745 3/2007
WO 2006090197 8/2006

OTHER PUBLICATIONS

International Bureau, "International Preliminary Report on Patentability," issued in connection with corresponding PCT/US2008/061177, mailed Jan. 7, 2010, 7 pages.

(Continued)

Primary Examiner — Steven J Hylinski
(74) Attorney, Agent, or Firm — Hanley, Flight & Zimmerman, LLC (57) ABSTRACT Methods and apparatus to meter video game play are disclosed. An example method includes detecting media identifying information corresponding to media presented in an environment including a video game system capable of executing a plurality of video games; identifying which of the plurality of video games is being played via a video game controller based on the media identifying information, wherein the video game controller is coupled to a sensor to detect motion data related to movement of the video game controller and to transmit the motion data without affecting operation of the video game system; and combining, via a processor, the media identifying information with the motion data received from the sensor.

22 Claims, 7 Drawing Sheets

(56) References Cited

U.S. PATENT DOCUMENTS

| | | | |
|---|---|---|---|
| 4,779,198 | A | 10/1988 | Lurie |
| 4,984,578 | A | 1/1991 | Keppel et al. |
| D326,646 | S | 6/1992 | Matsui |
| 5,257,179 | A | 10/1993 | DeMar |
| 5,470,079 | A | 11/1995 | LeStrange et al. |
| 5,502,374 | A | 3/1996 | Cota |
| 5,502,379 | A | 3/1996 | Hansel et al. |
| 5,579,238 | A | 11/1996 | Krugman |
| 5,745,376 | A | 4/1998 | Barker et al. |
| 5,785,317 | A | 7/1998 | Sasaki |
| 5,848,396 | A * | 12/1998 | Gerace .................. 705/7.33 |
| D407,377 | S | 3/1999 | Landerholm et al. |
| 5,896,164 | A | 4/1999 | Orbach et al. |
| 5,913,310 | A | 6/1999 | Brown |
| 5,991,735 | A * | 11/1999 | Gerace .................. 705/7.33 |
| 6,050,897 | A | 4/2000 | Suzuki et al. |
| 6,066,075 | A | 5/2000 | Poulton |
| 6,067,468 | A | 5/2000 | Korenman et al. |
| 6,251,014 | B1 | 6/2001 | Stockdale et al. |
| 6,278,823 | B1 | 8/2001 | Goldner et al. |
| 6,335,672 | B1 | 1/2002 | Tumlin et al. |
| 6,352,516 | B1 | 3/2002 | Pozos et al. |
| 6,379,246 | B1 | 4/2002 | Dabrowski |
| 6,450,820 | B1 | 9/2002 | Palsson et al. |
| D464,325 | S | 10/2002 | Peters et al. |
| 6,503,147 | B1 | 1/2003 | Stockdale et al. |
| 6,590,536 | B1 | 7/2003 | Walton |
| 6,612,929 | B2 | 9/2003 | Fujimoto et al. |
| 6,673,026 | B2 | 1/2004 | Pozos et al. |
| 6,743,095 | B2 * | 6/2004 | Cole et al. .................. 463/25 |
| 6,786,297 | B1 | 9/2004 | Menard |
| 6,831,603 | B2 | 12/2004 | Menache |
| 7,025,676 | B2 * | 4/2006 | Cole et al. .................. 463/25 |
| 7,223,173 | B2 | 5/2007 | Masuyama et al. |
| 7,260,823 | B2 | 8/2007 | Schlack et al. |
| 7,412,883 | B2 | 8/2008 | Krullaards |
| 7,674,177 | B2 | 3/2010 | Cole |
| 7,737,944 | B2 | 6/2010 | Harrison et al. |
| 7,753,788 | B2 | 7/2010 | Lum et al. |
| 7,771,271 | B2 * | 8/2010 | Walker et al. .................. 463/25 |
| 7,782,297 | B2 | 8/2010 | Zalewski et al. |
| 7,896,739 | B2 | 3/2011 | Cole |
| 2002/0144259 | A1 | 10/2002 | Gutta et al. |
| 2004/0106449 | A1 | 6/2004 | Walker et al. |
| 2004/0214633 | A1 | 10/2004 | Cole et al. |
| 2005/0210417 | A1 | 9/2005 | Marvit et al. |
| 2006/0178208 | A1 | 8/2006 | Cole |
| 2006/0264260 | A1 | 11/2006 | Zalewski et al. |
| 2006/0282873 | A1 | 12/2006 | Zalewski et al. |
| 2007/0015558 | A1 | 1/2007 | Zalewski et al. |
| 2007/0208542 | A1 | 9/2007 | Vock et al. |
| 2007/0260517 | A1 | 11/2007 | Zalewski et al. |
| 2010/0137059 | A1 | 6/2010 | Cole |

OTHER PUBLICATIONS

Patent Cooperation Treaty, "International Search Report," issued by the International Searching Authority in connection with counterpart PCT application No. PCT/US2008/061177, mailed Jul. 11, 2008, 3 pages.

Patent Cooperation Treaty, "Written Opinion of the International Searching Authority," issued by the International Searching Authority in connection with counterpart PCT application No. PCT/US2008/061177, mailed Jul. 11, 2008, 6 pages.

United States Patent and Trademark Office, "Office Action," issued in connection with U.S. Appl. No. 12/023,844, Jun. 23, 2011, 13 pages.

United States Patent and Trademark Office, "Final Office Action," issued in connection with U.S. Appl. No. 12/023,844, Nov. 22, 2011, 28 pages.

United States Patent and Trademark Office, "Office Action," issued in connection with U.S. Appl. No. 12/023,844, Apr. 23, 2012, 37 pages.

United States Patent and Trademark Office, "Notice of Allowance and Fees Due," issued in connection with U.S. Appl. No. 12/023,844, Dec. 20, 2012, 27 pages.

* cited by examiner

METHODS AND APPARATUS TO METER VIDEO GAME PLAY

RELATED APPLICATION

This patent arises from a continuation of U.S. patent application Ser. No. 12/023,844, filed Jan. 31, 2008, now U.S. Pat. No. 8,430,752, which claims priority from U.S. Provisional Patent Application Ser. No. 60/936,390, filed on Jun. 20, 2007, entitled "Methods and Apparatus to Meter Video Game Play." U.S. patent application Ser. No. 12/023,844 and U.S. Provisional Patent Application Ser. No. 60/936,390 are hereby incorporated herein by reference in their entireties and priority to both applications is claimed.

FIELD OF THE DISCLOSURE

The present disclosure relates generally to media monitoring and, more particularly, to methods and apparatus to meter video game play.

BACKGROUND

Consuming media presentations (e.g., audio and/or video presentations) generally involves listening to audio information and/or viewing video information. Media presentations may include, for example, radio programs, music, television programs (free, satellite, cable, internet protocol television (IPTV), etc.), movies, still images, recorded media (e.g., Digital Versatile Disk (DVD), personal video recorder), playback, video games, etc. Media-centric companies and/or metering entities such as, for example, advertising companies, broadcast networks, etc. are often interested in the viewing, listening, and/or media behavior interests of audience members to better market their products and/or to improve their programming. Techniques used to monitor and/or measure the behavior of audience members often include the use of diaries/logs and/or one or more metering devices.

Metering devices may be carried by audience members and/or placed on or near a television and/or other monitored presentation device. Such a meter may include one or more sensors to detect and/or collect audio and/or video content in, for example, the audience member's household, such as in a family room that has a television, cable and/or satellite set-top unit, VCR, stereo, video game console, etc. The one or more sensors may detect and/or collect audio codes, video codes, signatures, channel tuning and/or changes, audience member movement, and/or remote control (e.g., infra-red (IR) sensors) inputs. To determine which program the household member is consuming, the meter may collect codes embedded or otherwise associated with the presented media and/or signatures (e.g., audio samples of the media to which the audience member is exposed) and send such codes and/or signatures to a central office and/or metering entity. The central office utilizes collected code(s) to index a lookup table to perform media content identification, and/or compares the collected signatures to one or more databases of reference signatures to determine a match to identify the media.

DETAILED DESCRIPTION

Figure 1:
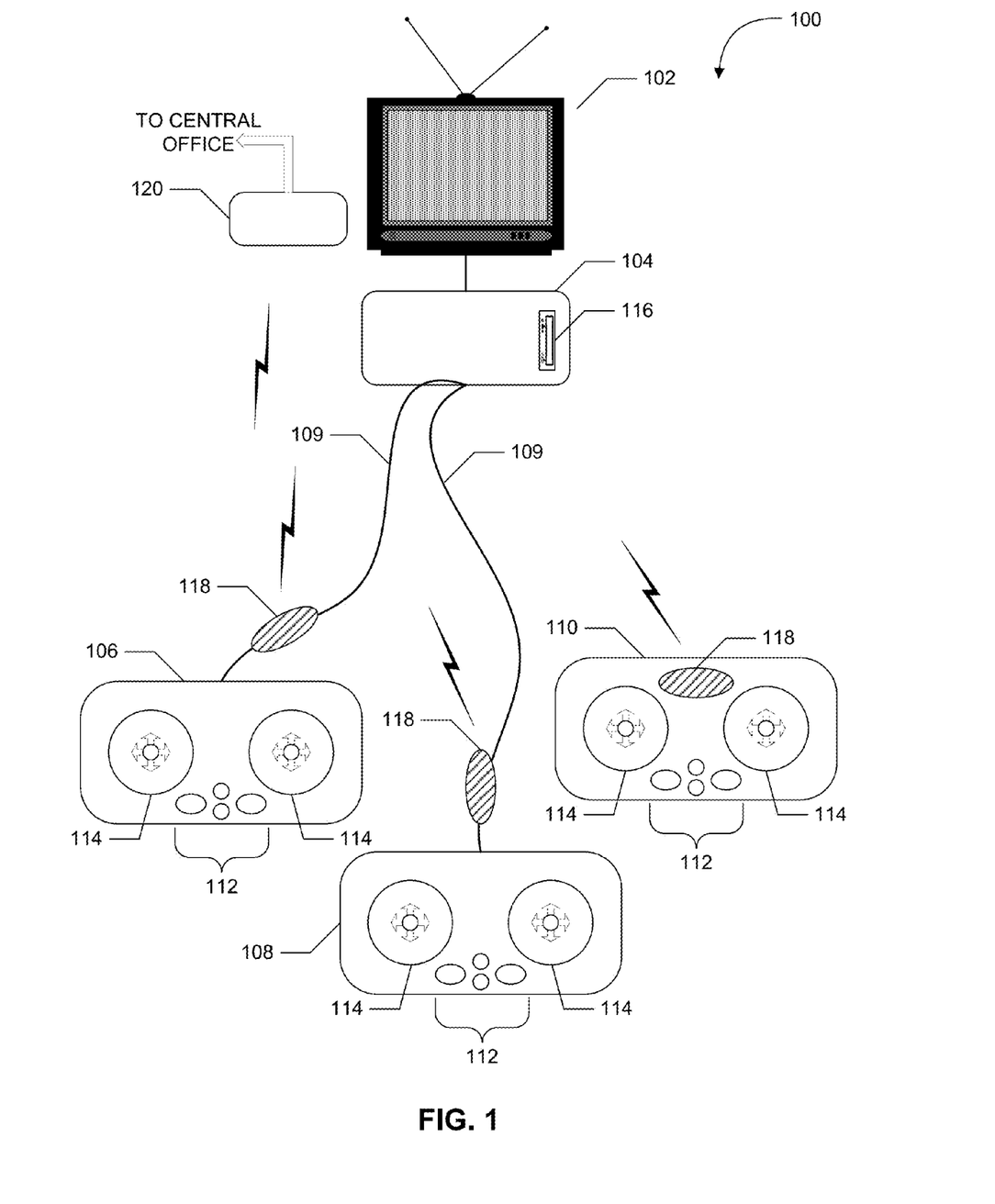
FIG. 1 illustrates an example system for metering game play.

Video game play may be monitored by asking selected households and/or corresponding audience members to keep a log and/or diary of activity when using a video game console. However, such demands may be viewed as invasive and/or cumbersome to the audience members. In general, the example methods and apparatus illustrated herein may be used to unobtrusively monitor video game activity of one or more audience members. The example methods and apparatus illustrated herein may be well suited for monitoring one or more game controllers communicatively coupled to a game console via control wire(s) and/or controllers that wirelessly communicate with the game console. Turning to FIG. 1, an example system 100 to meter video game play is shown. The example system 100 of FIG. 1 is adapted to monitor game play on a media presentation device 102 (e.g., a television, a monitor, etc.) operatively connected to a video game console 104. In the illustrated example shown in FIG. 1, the video game console 104 is operatively connected to wire-based controllers 106, 108 having wires 109 communicatively coupling the controllers 106, 108 to the console 104, and to a wireless controller 110 that sends game control signals to the video game console 104 wirelessly (e.g., using radio frequency (RF) signals). Each controller 106, 108, 110 includes one or more buttons 112, switches, and/or joysticks 114 to allow a user to control game play, such as directional game character motion via the joystick. Other types of controllers such as the Wii® nunchuck controller, a simulated golf club controller, etc., could alternatively be used and can be monitored in an analogous manner to that described below (e.g., via an attached game tag).

The user may initiate any type of game with the example game console 104 via a media input port 116. Video game console manufacturers provide game media in several formats including, but not limited to, compact disk (CD) read only memory (ROM) disks, digital versatile disks (DVDs), game cartridges, memory cards/sticks, intranet connections (e.g., local area networks, etc.), and/or Internet connections. The game console 104 may be implemented by, for example, any of the X-Box® or X-Box 360® by Microsoft®, the PlayStation® (e.g., the PlayStation I, II, or III) by Sony®, and/or the Gamecube® or Wii® by Nintendo®.

In the illustrated example shown in FIG. 1, each controller 106, 108, 110 includes an attachable game tag 118 to detect if and/or when the user is interacting with the controller 106, 108, 110. The example game tag(s) 118 include a motion sensor, discussed in further detail below, to detect orientation, tilt, and/or acceleration forces applied to the controller 106, 108, 110. The game tag(s) 118 may attach to the wired controllers 106, 108 by clamping on or around the wire 109. The game tag(s) 118 may attach to the wireless controllers 110 by, for example, an adhesive material, Velcro® strip, and/or other connectors, brackets, etc.

Signals indicative of controller motion may be wirelessly transmitted from the game tag(s) 118 and received by a game tag meter 120. In the illustrated example, each of the game tag(s) 118 includes an identification code so that, in the likely event multiple controllers are associated with the game console 104, activity from each controller 106, 108, 110 may be independently identified. Independent identification of multiple controllers allows a determination of how many individuals are participating in game play with the example game console 104 and how each member is using the controller. The wireless transmission from each game tag 118 may include an RF signal of any type including, but not limited to, Bluetooth® signals and/or WiFi® signals. Additionally or alternatively, the wireless transmission from each game tag 118 may include ultrasonic signal(s) or optical signal(s) (e.g., infra-red (IR)). RF signals may propagate through one or more walls, thus potentially become detected by an example game tag meter 120 in another room. On the other hand, ultrasonic and/or optical transmissions may reduce and/or eliminate the possibility of one or more game tags 118 located in alternate rooms (e.g., adjacent room(s), adjacent apartment(s), adjacent dorm-room(s), etc.) from communicating with the example game tag meter 120 and, thus, reduces the likelihood of errant detections. To the extent that the methods and apparatus described herein include specific type(s) of signal(s), such descriptions are used for ease of explanation and not meant to exclude usage of other signal types.

A battery located within the game tag 118 provides power to the game tag 118. The game tag 118 is constructed to detect motion and to store motion data indicative of the detected motion for a corresponding controller 106, 108, 110. The example game tag 118 is also structured to transmit signals representative of the motion data to the game tag meter 120. To conserve battery power consumption, the example game tag(s) 118 may be adapted to transmit a burst of energy (e.g., RF energy such as a Bluetooth® signal, a WiFi® signal, an ultrasonic signal, an IR signal, etc.) once every x unit(s) of time (e.g., once every five minutes). However, any other time threshold may be employed (e.g., to accommodate for one or more battery types and/or number of batteries employed by the example game tag 118). Additionally or alternatively, the example game tag(s) 118 may transmit only after some threshold amount of motion has been detected so that battery power is not needlessly consumed by transmitting information payloads when there is little or no motion data to report.

In the illustrated example, the game tag(s) 118 transmit game tag signals (referred to herein as payload information) to the example game tag meter 120 which include information indicative of controller motion or lack thereof (e.g., a logic "1" for motion and a logic "0" for no motion), a time at which the motion detection event occurred, a magnitude and/or direction of the detected motion, a game tag identification number, and/or an indication of available battery power associated with the game tag identification number. The information received by the example game tag meter 120 may then be transmitted to the central office and/or metering entity via any desired communication medium (e.g., land-line modem communication, cable modem communication (e.g., via an Internet connection), and/or a cellular/wireless telephone connection).

Figure 2A:
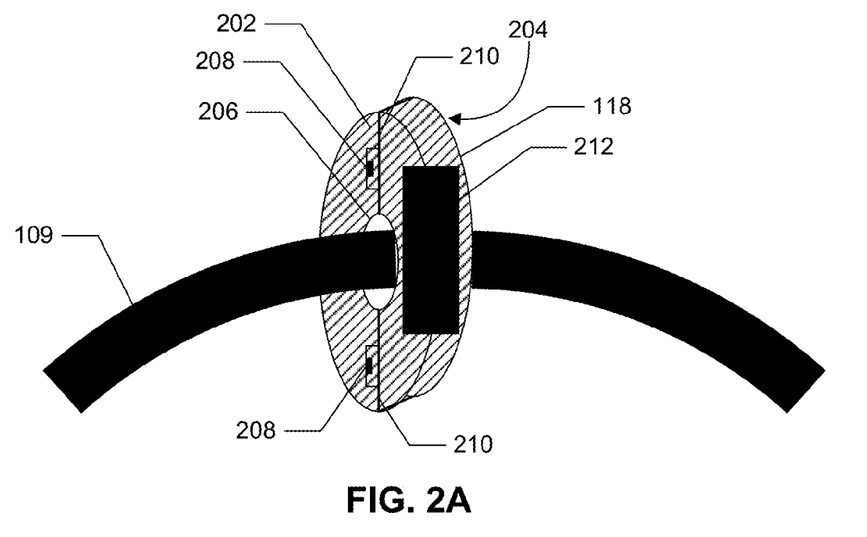
FIGS. 2A and 2B are profile views of an example game tag for use with the system of FIG. 1.

FIG. 2A illustrates an example implementation of any one of the example game tag(s) 118 of FIG. 1. In a preferred example, the form factor of the game tag 118 is more cylindrical than shown in FIG. 2A. In particular, the form factor of a preferred example is similar to a cord mount ferrite filter used on the power cored of, for example, a personal computer. In the illustrated example of FIG. 2A, the game tag 118 is annular. More specifically, the tag 118 has a front side 202, a back side 204, and is generally circular in shape with a centrally located hole 206 to allow the controller wire 109 to pass there through. For purposes of illustration, the example centrally located hole 206 is shown to be larger than the diameter of the controller wire 109, but the diameter of the centrally located hole 206 is preferably configured such that an interference fit securely fastens the example game tag 118 to the controller wire 109. Additionally or alternatively, grommets, malleable filler material, and/or other padding material may be securably attached to the wall defining the centrally located hole 206 to achieve a relatively tight interference fit between the game tag 118 and the controller wire 109. Such added interface material may be used to conform the tag 118 to one or more different sizes of wire 109. The example game tag 118 is shown in FIG. 2A as having a generally circular shape for illustrative purposes only. The game tag 118 may be implemented with any desired shape.

Figure 2B:
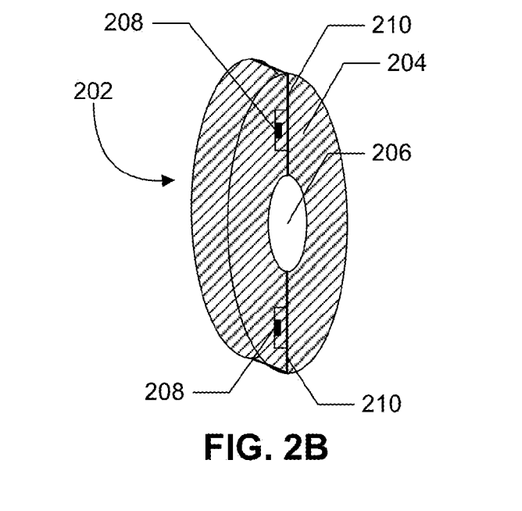

The example game tag 118 of FIG. 2A also includes locking tabs 208 to facilitate attachment and/or removal of the game tag 118 to/from the example controller wire 109. For example, the game tag 118 may separate into two halves with each side operatively coupled at a common boundary 210. FIG. 2B illustrates the back side 204 of the example game tag 118 of FIG. 2A. As shown in FIG. 2B, the rear side of the example tag 118 includes two additional locking tabs 208 that ensure both halves of the tag 118 remain securely fastened to the controller wire 109 during operation. By way of illustration, not limitation, the tag 118 may alternatively employ hinges in place of the locking tabs 208.

Returning to FIG. 2A, a tag circuit 212 is attached to or embedded within the example game tag 118. In the illustrated example, the circuit 212 includes a housing, power supply (e.g., batteries), and circuitry to detect motion, orientation, tilt, and/or acceleration. While the user is engaged with video game play, some of the motions/forces induced by the user with the game controller 106, 108, 110 propagate along the controller wire 109 and are imparted to the game tag 118. On the other hand, for wireless game controllers, such as the example wireless game controller 110 of FIG. 1, at least some of the motions/forces induced by the user are imparted directly to the example game tag 118 (which is attached to the wireless controller 110 via, for example, glue, Velcro®, etc.). In the illustrated example of FIG. 2A, the tag circuit 212 detects motion(s) and/or force(s) and saves detected motion(s) and/or force(s) in a memory. Upon expiration of a periodic timer (e.g., every five minutes), the tag circuit 212 measures a current battery capacity, retrieves the motion data from the memory, and transmits the payload information to the tag meter 120.

As discussed in further detail below, the tag circuit 212 of the illustrated example employs one or more types of motion sensors. The type(s) of sensor(s) employed depends on the granularity of the data desired. For example, the sensor(s) may simply detect movement and provide only an indication that some unspecified motion occurred. Additionally or alternatively, the motion sensor(s) of the tag circuit 212 may comprise accelerometers oriented along different axes to, for example, measure an acceleration for an x-axis, a y-axis, and/or a z-axis. Additionally or alternatively, the motion sensor(s) of the tag circuit 212 may include a digital compass to measure a change in orientation of the example game tag 118 as induced by user movement of the controller 106, 108, 110.

Figure 3A:
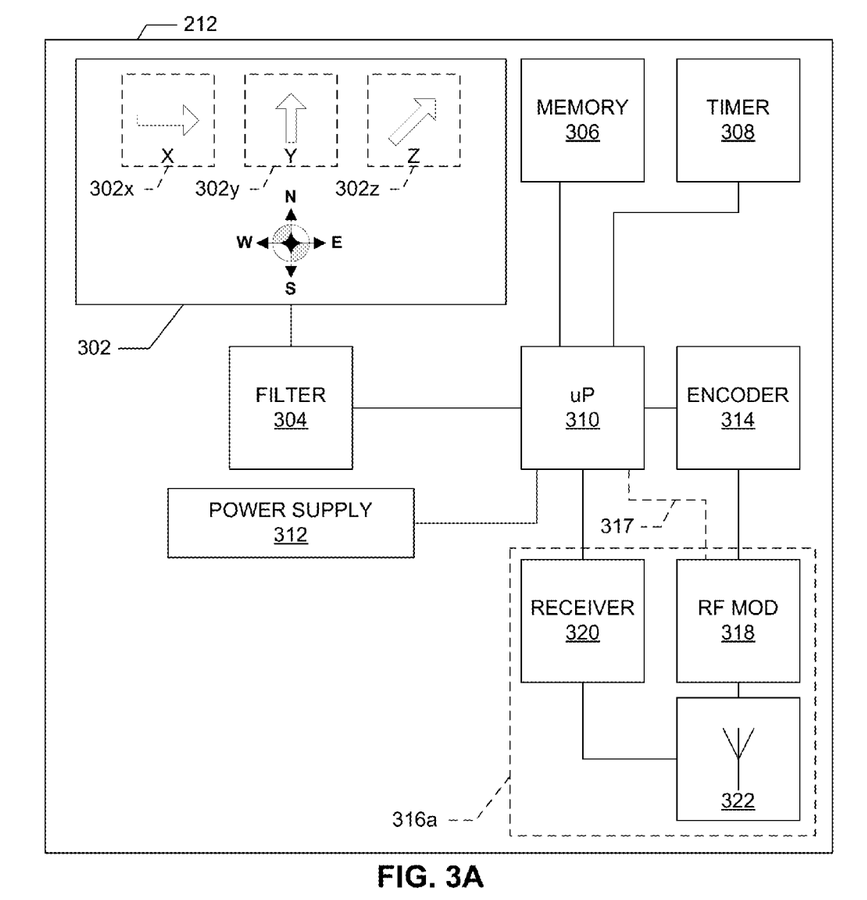
FIGS. 3A-C illustrate a block diagram of an example game tag for use with the system of FIG. 1.
Figure 3B:
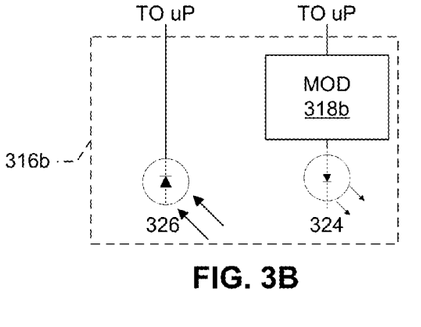
Figure 3C:
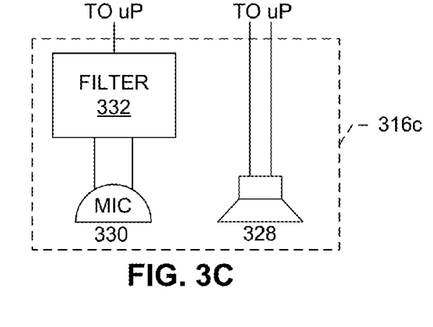

FIGS. 3A, 3B, and 3C illustrate the example tag circuit 212 of FIG. 2A in greater detail. In the illustrated example of FIG. 3A, the tag circuit 212 includes a motion sensor 302, a filter 304, a memory 306, a timer 308, a processor 310, and a power supply 312. Additionally, the example tag circuit 212 of FIG. 3A includes an encoder 314 and a transceiver 316a. In the illustrated example, the transceiver 316a includes an RF modulator 318a, an RF receiver 320, and an antenna 322. As discussed in further detail below, the example tag circuit 212 may be configured to both transmit and receive information, or may be configured only to transmit information that is, for example, indicative of game play motion(s). In the latter case, the example transceiver 316a includes the RF modulator 318a and the antenna 322, but excludes the receiver 320.

As described above, ultrasonic and/or optical signals may be employed to communicate to/from the example tag circuit 212. Accordingly, the example tag circuit 212 may employ, additionally or alternatively, an optical transceiver 316b (as illustrated in FIG. 3B) and/or an acoustic transceiver 316c (as illustrated in FIG. 3C). In the illustrated example of FIG. 3B, the optical transceiver 316b includes a modulator 318b, one or more light emitting diodes (LEDs) 324, and a photodetector 326. The example modulator 318b may include an operational amplifier (OpAMP) to, for example, drive the LEDs 324 in response to signals from the processor 310. The example processor 310 may be directly connected 317 to the example modulator 318b of the optical transceiver 316b.

Additionally or alternatively, tag circuits 212 that employ acoustic signals (e.g., ultrasonic) for communication to/from the example game tag meter 120 may include an acoustic transceiver 316c. In the illustrated example of FIG. 3C, the example acoustic transceiver 316c includes an acoustic source 328 (e.g., an ultrasonic transducer, a speaker, etc.), and an acoustic detector 330 (e.g., a microphone). The example acoustic transceiver 316c may also include one or more filters 332 to filter-out ambient noise/signals not associated with communication between the game tag 118 and the game tag meter 120.

The example motion sensor 302 of FIG. 3A may be of any type including, but not limited to, a single or multi-axis accelerometer, a tilt sensor, and/or a magnetic compass. An audience member holding a game controller 106, 108, 110 will typically shake, tilt, and/or otherwise move the controller 106, 108, 110. Such movements may be intended to be converted into electronic signals by the controller (e.g., the Wii® nunchuck) or may result from adjusting a joystick 114 and/or pressing button(s) 112. Some games elicit relatively fast movements from the audience member and test the audience member's hand/eye coordination (for example, first-person shooter combat games). In these and/or other examples, audience members may induce relatively strong forces on the controller 106, 108, 110 (e.g., when attempting to shoot, attack, and/or defend a character in the first-person shooter game). Relatively strong forces induced on the game controller 106, 108, 110 may also be caused by elements of surprise. Relatively moderate forces may be induced on the game controller by the audience member when playing, for example, driving and/or flying games. For example, forces induced on the game controller 106, 108, 110 during a driving game may include relatively smooth movement transitions from left to right, and/or vice-versa, while the audience member attempts to steer the game vehicle through a track and/or obstacle course. Of course, relatively strong forces may be induced by the audience member on the example controller 106, 108, 110 when, for example, the vehicle veers out of virtual control and crashes, but such moments of relatively strong audience member induced forces tend to be less frequent with driving/flying games than with first-person shooter games.

Additionally, some games may include very few moments in which the audience member induces one or more strong and/or moderate forces (e.g., rapid tilting and/or shaking, etc.) on the example controller 106, 108, 110. For example, strategy-based video games and/or video games related to traditional board games, such as, for example, Monopoly®, typically involve a relatively gentle manner of control with the example controller 106, 108, 110.

While the example motion sensor 302 of FIG. 3A may include one or more transducers and/or sensors to provide an indication of movement, tilt, and/or orientation, some transducers and/or sensors may, additionally or alternatively, provide an indication of the magnitude of the movement. In the event that the example motion sensor 302 includes one or more accelerometers, then acceleration forces in one or more directions may be measured. Some accelerometers may provide acceleration force data with respect to a single axis of movement and/or rotation. Multiple accelerometers may be incorporated into the motion sensor 302 so that each axis of movement (e.g., an x-axis 302x, a y-axis 302y, a z-axis 302z, one or more axes of rotation, etc.) may be monitored. In such examples, each of the accelerometers may produce a voltage that is proportional to the corresponding force it detects. Any desired type of accelerometer may be employed, without limitation (e.g., piezoelectric accelerometers, capacitive accelerometers, piezoresistive accelerometers, etc.).

In operation, the example motion sensor 302 collects the force and/or orientation data from one or more accelerometers 302x, 302y, 302z and saves such data in the memory 306. Before, during, and/or after saving data to the example memory 306 that is indicative of motion of the tag circuit 212 (and, thus, motion of the game controller 106, 108, 110), the processor 310 retrieves a time-stamp from the example timer 308 and associates the same with the motion data. The example timer 308 may be a real-time clock that is set and/or calibrated by a metering entity before sending the game tag to the audience monitored household (which may be statistically selected to represent a population (e.g., demographic) group of interest).

Alternatively or additionally, the example timer and/or real-time clock 308 may be an integral function of the processor 310 such as, for example, the PIC10F200 8-bit flash microcontroller by Microchip®.

The example processor 310 takes one or more measurements from the example motion sensor 302. These measurements may be taken at periodic and/or predetermined times. The example processor 310 may save only those measurements that meet and/or exceed a threshold value. The threshold may be a magnitude of force threshold and/or a duration (time) of sustained movement threshold. For example, the example processor 310 may ignore motion data from the example motion sensor 302 if the magnitude of the measured forces do not exceed a particular force magnitude value, thereby masking force data that may be associated with game controller movement that corresponds to non-game-play activities. Non-game-play activities may include, but are not limited to, moving the example game controller 106, 108, 110 within an entertainment console to access other entertainment media and/or media devices. In the event that the example game controller 106, 108, 110 is stored in a cabinet of an entertainment console that also houses a collection of DVDs, CDs, and/or VHS tapes, then an audience member may inadvertently and/or purposefully move the game controller 106, 108, 110 out of the way to access the one or more DVDs, CDs, and/or VHS tapes. Accordingly, the example processor 310 may compare the magnitude(s) of the force(s) associated with such small movement(s) to one or more thresholds and prevent them from being saved to the memory 306 of the example tag circuit 212 if the threshold(s) are not exceeded. Ignoring brief movements surrounded by long period of inactivity can similarly be used to screen non-play activity.

Additionally or alternatively, the example processor 310 may employ the filter 304 to mask one or more forces that are not associated with motions created by the audience member during game play. For example, some controllers 106, 108, 110 are provided with haptic technology, which seeks to provide the audience member with a tactile sensation during game-play. Haptic technologies are sometimes referred to as "force feedback," "haptic feedback," and/or a "RumblePak®", which is a term used by Nintendo® for some of their controllers. Game scenarios that invoke one or more haptic forces include, but are not limited to, a game character being struck by enemy gun-fire and/or crashing a vehicle into a wall of a race track. In response to one or more such scenarios, the example controller 106, 108, 110 may vibrate and/or shake within the hand(s) of the audience member. Vibration forces may be created by, for example, one or more electric motors within the example controller 106, 108, 110 that spin one or more weights in an eccentric path. The example filter 304 may be tuned to one or more frequencies exhibited by the haptic force(s) to differentiate between forces associated with the haptic technology and/or forces potentially caused by audience member movement(s).

The example tag circuit 212 may collect data indicative of audience member game play for a predetermined time period and then send such collected data to the example tag meter 120 via a signal (e.g., RF, acoustic, optic). For example, the example timer 308 may send a signal to the processor 310 every five-minutes to prompt the processor 310 to retrieve saved motion data (if any) from the memory 306. In the illustrated example of FIG. 3A, the processor 310 also measures a capacity of the power supply 312 before sending the signal (e.g., RF, acoustic, optic) to the tag meter 120. The power supply 312 may include one or more batteries that provide power to the tag circuit 212 and may be serviceable by the audience member, or require that the audience member send and/or receive a new game tag 118 and/or tag circuit 212 when the battery power drops below a threshold value. The processor 310 employs the encoder 314 to encode a data payload that includes, for example, the battery capacity, the motion data indicative of audience member game play stored in the memory 306 including the associated time(s) of the detected motion event(s), and/or a tag circuit 212 identification number, which may be stored in the memory 306. The identification number associated with the tag circuit 212 may be unique (e.g., a manufacturer may assign each tag circuit a unique alphanumeric identifier) or locally unique to the game console 104 or household thereof (e.g., the tag circuits sent to a household are unique to each other but may be reused in other households). The encoder 314 sends the encoded payload to the transceiver 316, which modulates the encoded payload with the RF modulator 318 and transmits an RF signal of the payload via the antenna 322.

Additionally or alternatively, the example tag circuit 212 may include a receiver 320 that receives a signal from the tag meter 120 requesting that a payload be sent. For example, to promote preservation of battery power, the example tag circuit 212 may be configured to only send payload data in response to one or more instances of audience game play being detected by the motion sensor 302. Game consoles 104 may not be used by audience members on a daily basis. Indeed, such game consoles 104 may not be used for several days and/or weeks. As such, rather than the tag circuit 212 transmitting a chirp (e.g., an RF chirp, an ultrasonic chirp, an optical chirp) every, for example, five minutes to maintain an updated awareness of tag circuit 212 functionality (e.g., sufficient battery power), the tag meter 120 may initiate a payload request once per day, once per week, etc.

If the battery capacity of the power supply 312 drops below a threshold level, the metering entity may send a new game tag 118, one or more new batteries, and/or a new tag circuit 212 to the household. Similarly, if the tag circuit 212 fails to transmit payload information and/or fails to respond to one or more requests to transmit payload information via the example receiver 320, then the metering entity may, by default, send one or more new game tag(s) 118, one or more new batteries, and/or new tag circuit(s) 212 to the household. In the event a new tag is sent, it may be accompanied by instructions to install the new tag and return the old tag (e.g., via a pre-addressed postage paid package).

Figure 4:
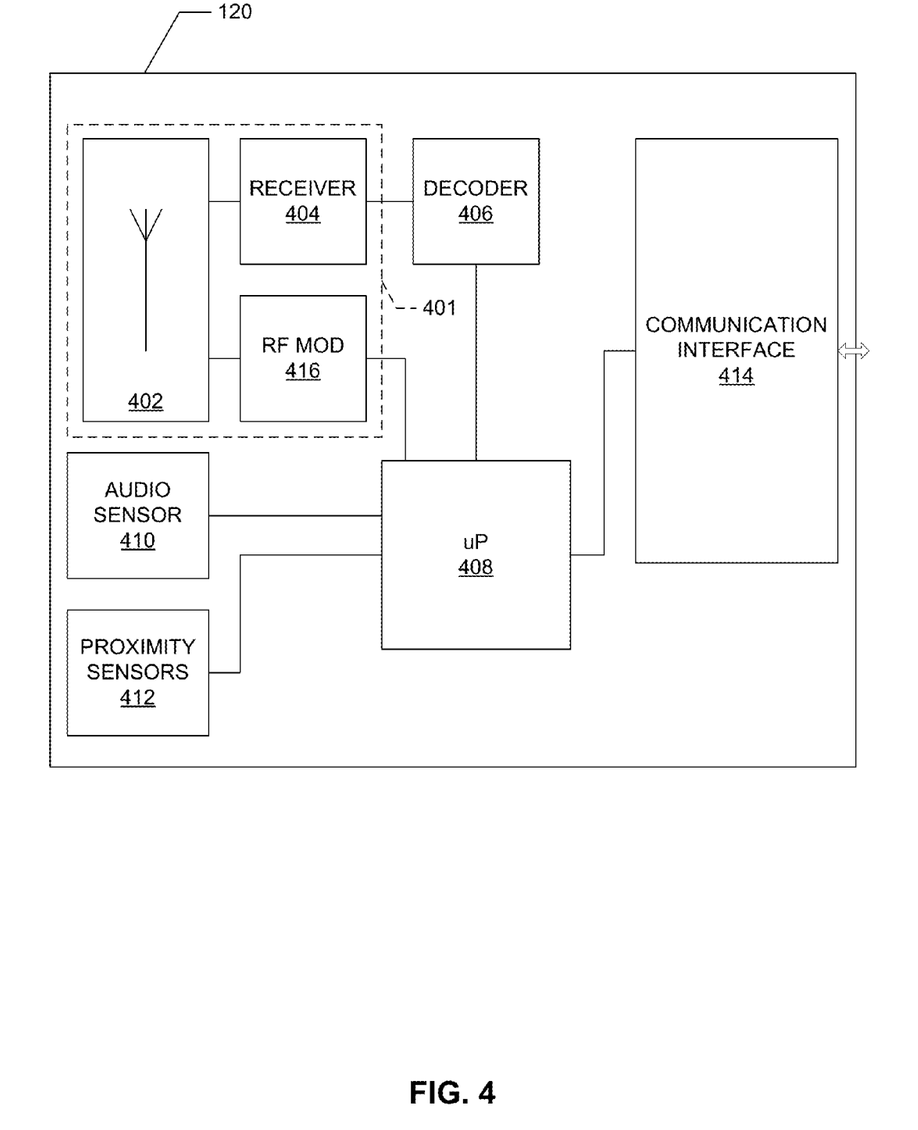
FIG. 4 is a block diagram of an example tag meter for use with the system of FIG. 1.

FIG. 4 illustrates the example tag meter 120 of FIG. 1 in greater detail. In the illustrated example of FIG. 4, the tag meter 120 includes an RF transceiver 401, which includes an antenna 402 and a receiver 404 to receive RF signals from one or more game tag(s) 118. As described above in view of FIGS. 3A-C, the example RF transceiver 401 may, additionally or alternatively, be replaced with or supplemented with an acoustic transceiver and/or an optical transceiver (e.g., to alleviate any complexities caused by RF signals traveling through walls). The tag meter 120 also includes a decoder 406 to decode and/or otherwise extract payload information from received RF signals, and a processor 408. The example game meter 120 of FIG. 4 may also include an audio sensor 410 (e.g., microphone) to detect audio signals associated with monitored information presenting devices such as media content played on a television (e.g., movies, situation comedies, video game audio, etc.). Such audio data may be used to identify the program a game presented on the information presenting device (e.g., by collecting embedded audio codes identifying the content and/or collecting one or more signatures representative of the content.) Additionally or alternatively, the example game meter 120 may include one or more proximity sensors 412 to detect whether audience members are present in the vicinity of the game console 104 and/or the information presenting device. The detection of the presence of audience members can be performed using the techniques disclosed in U.S. Pat. No. 7,100,181, which is hereby incorporated by reference in its entirety.

In the illustrated example of FIG. 4, payload data received by the game meter 120 (e.g., as RF signals) are sent by the processor 408 to a communication interface 414, which is communicatively connected to the metering entity. For example, the communication interface 414 may be communicatively connected to the metering entity via an Internet connection, intranet connection, a land-line telephone connection, a wireless telephone connection, and/or a communication network employed by a cable broadcast provider.

The example game meter 120 of FIG. 4 includes an RF modulator 416 to send a request signal to one or more game tag(s) 118 to initiate transmission of payload information. Additionally or alternatively, where an ultrasonic transceiver is implemented on the game meter, an ultrasonic trigger may be used to send the request signal to the game tag(s) 118. Such a request may be prompted by the processor 408 that executes one or more programs to monitor for time periods of no game tag reporting activity, or the request may be initiated by the metering entity via the communication interface 414. In the illustrated example of FIG. 4, the RF modulator 416 allows the metering entity to determine a health status of batteries in the power supply 312, even if the game tag 118 has not been used by a household member for a relatively long period of time. As described above, if the game tag 118 is configured to transmit payload information (e.g., battery status information, detected motion events, etc.) at five-minute intervals, but only when motion is detected, then several days or weeks may elapse without a transmission from the game tag 118 to the metering entity. On the other hand, if the game tag 118 is configured to transmit payload information every five-minutes even if no motion has been detected, then the batteries in the power supply 312 of the tag circuit 212 may needlessly consume power. To address this concern, the RF modulator 416 in the tag meter 120 of the illustrated example is configured to prompt the tag circuit 212 to transmit payload information upon request, thereby avoiding the need for the game tag 118 to needlessly send battery status messages and, thus, conserving battery power of the tag circuit 212.

Figure 5:
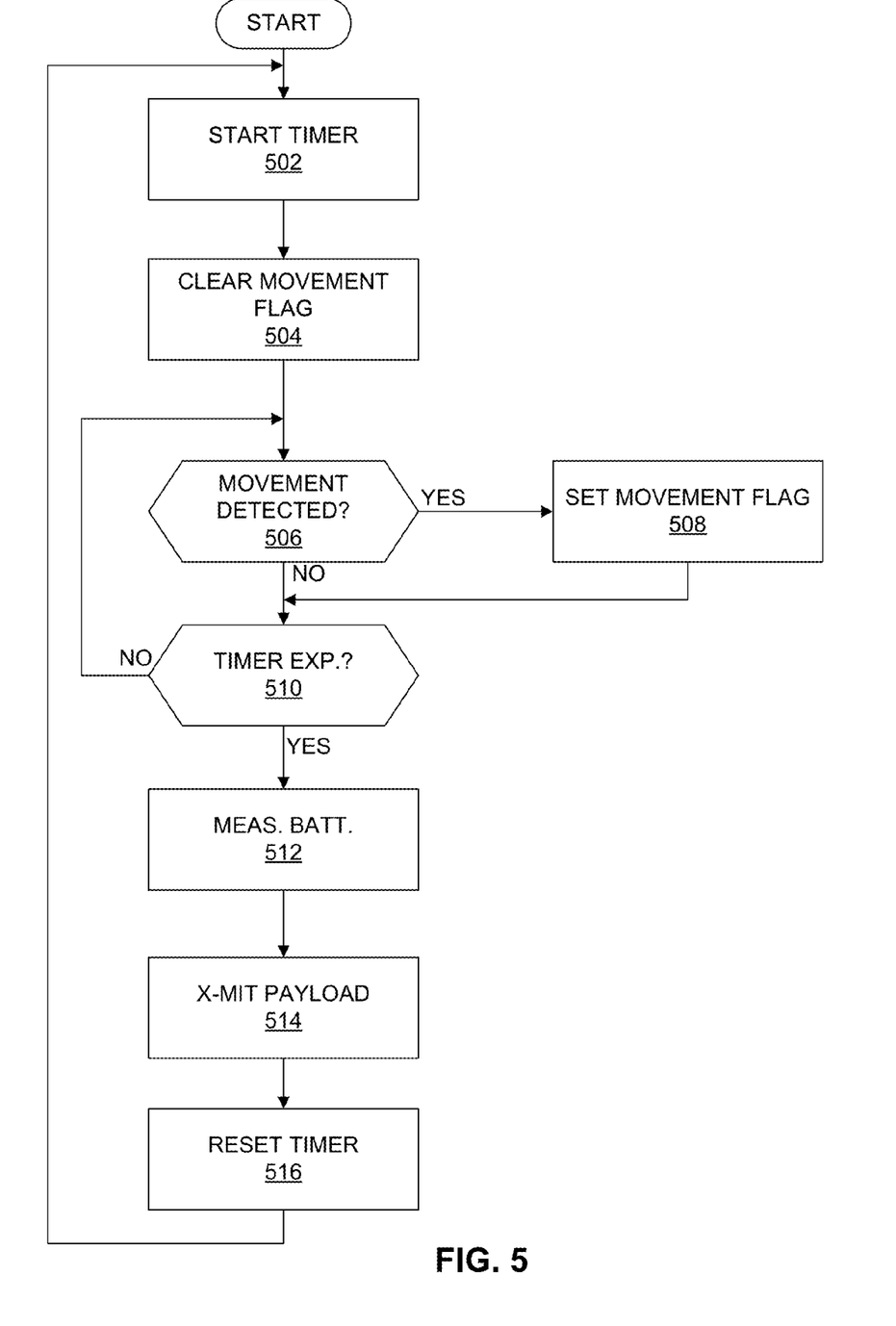
FIGS. 5 and 6 are flow diagrams representative of example machine readable instructions that may be executed to implement the example system of FIG. 1.
Figure 6:
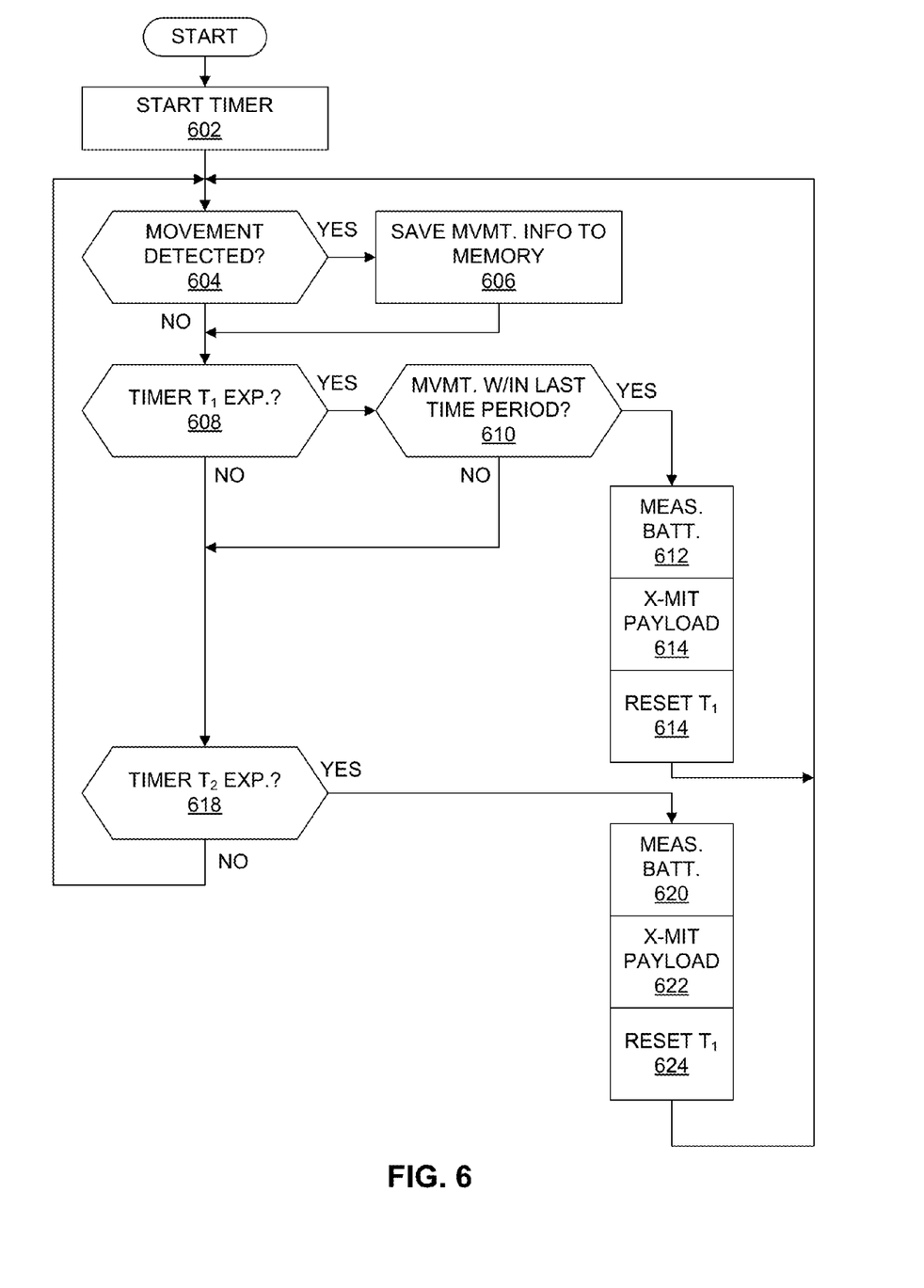
Figure 7:
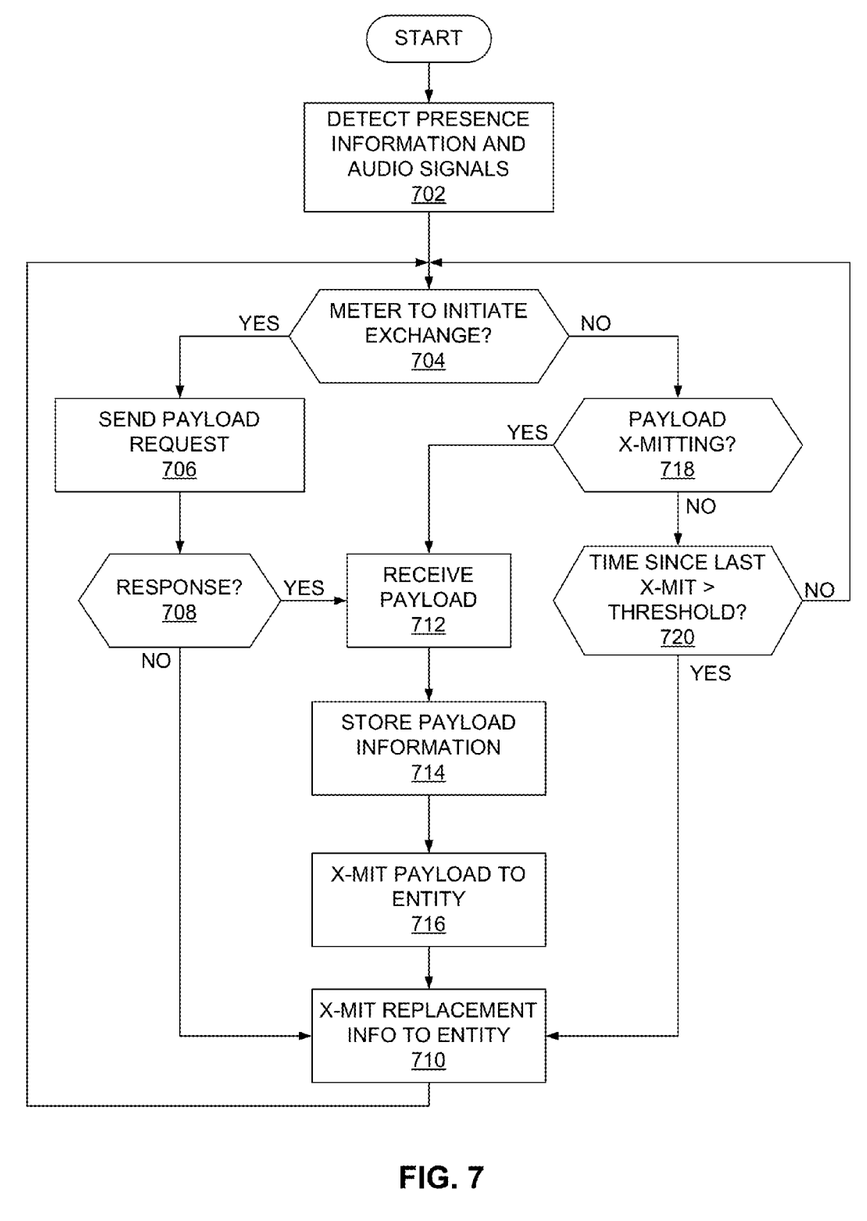
FIG. 7 is a flow diagram representative of example machine readable instructions that may be executed to implement the example tag meter of FIG. 4.

Flowcharts representative of example machine readable instructions for implementing the example system 100 of FIG. 1 are shown in FIGS. 5, 6, and 7. In these examples, the machine readable instructions comprise one or more program(s) for execution by a processor (e.g., the processors 310 or 408 of FIGS. 3A and 4), a controller, and/or any other suitable processing device. The program(s) may be embodied in software stored on a tangible medium such as, for example, a flash memory, a CD-ROM, a floppy disk, a hard drive, a digital versatile disk (DVD), or a memory (e.g., the memory 306 of FIG. 3A) associated with a processor (e.g., the processors 310 or 408 of FIGS. 3A and 4), but all of the program(s) and/or parts thereof could alternatively be executed by another device and/or embodied in firmware or dedicated hardware (e.g., it may be implemented by an application specific integrated circuit (ASIC), a programmable logic device (PLD), a field programmable logic device (FPLD), discrete logic, etc.). For example, any or all of the filter 304, the timer 308, the encoder 314, and the decoder 406 could be implemented by software, hardware, and/or firmware. Also, some or all of the machine readable instructions represented by the flowcharts of FIGS. 5, 6 and 7 may be implemented manually. Further, although the example program is described with reference to the flowcharts illustrated in FIGS. 5, 6 and 7, many other methods of implementing the example machine readable instructions may alternatively be used. For example, the order of execution of the blocks may be changed, and/or some of the blocks described may be changed, substituted, eliminated, or combined.

The program of FIG. 5 begins at block 502 where the example timer 308 of the tag circuit 212 is initiated by the processor 310. As described above, the timer may be configured to run for five-minute intervals, but any other time interval may be employed, as desired. For example, the timer may run at shorter intervals when motion has recently been detected and longer intervals when no motion has been detected for a significant time. An example of this approach is discussed below in view of FIG. 6.

The processor 310 next clears a status bit of a movement flag stored in the memory 306 (block 504). For example, the tag circuit 212 may employ a motion sensor to indicate movement and/or tilt. Any number of motion sensors may be employed to detect potential indications of game play by the audience member including, but not limited to, controller tilt (e.g., via a mercury switch (and/or alternative liquid metal switch), an accelerometer, etc.), orientation change (e.g., via an electronic compass), and/or a magnitude of the detected motion event (e.g., one or more acceleration force(s) measured by a multi-axis accelerometer, etc.). Accordingly, if movement is detected by the example motion sensor 302 (block 506), then the processor 310 may set the movement flag in the memory 306 to a "1" or TRUE value (block 508). If movement is not detected (block 506), then the processor determines whether the timer 308 has elapsed and/or reached its time limit (block 510). If not, then control returns to block 506 to continue to monitor for game tag movement.

However, if the timer 308 expires and/or reaches its time limit (block 510), then the processor 310 measures the power supply 312 to determine the current battery capacity (block 512). The resulting capacity information (e.g., a voltage level of the batteries) may be saved in the memory 306 along with a timestamp indicating when that measurement occurred. The processor 310 assembles the payload information and encodes it using the example encoder 314. That is, the processor 310 extracts a unique game tag identification number from the memory 306, extracts the motion data (e.g., the movement flag, acceleration forces, etc.) from the memory 306, extracts the battery capacity information from the memory 306, along with any associated time stamps, and encodes all of this payload information using the example encoder 314. The encoded payload information is sent to the transceiver 316a, 316b, 316c where it is combined with a carrier (if necessary) and transmitted as a signal (e.g., an RF signal, an acoustic signal, an optical signal) to the tag meter 120 (block 514). The processor 310 then resets the timer (block 516) and control returns to block 502 to begin another time period.

As described above, if the example game tag 118 transmits a payload once per time period (e.g., once every five minutes), then some payload transmissions may occur whether or not movement activity has been detected, thereby potentially wasting battery power. FIG. 6 is a flowchart representative of example machine readable instructions for implementing the example system 100 of FIG. 1 that avoids this potential waste. In the illustrated example of FIG. 6, the example tag circuit 212 is configured to operate at least two timers 308, namely a first timer to prompt a payload transmission only if movement activity has been detected, and the second timer to prompt the payload transmission at a relatively longer time period even if no movement has been detected.

For example, a first time period may be set to five minutes, in which the tag circuit 212 will transmit the payload information to the tag meter only if, within that five minute period of time, movement has been detected. As a result, battery power is conserved during relatively longer periods of time (e.g., multiple days, weeks, etc.) in which the audience member does not use the video game console 104 by restricting the frequency of payload transmissions on an occurrence basis. On the other hand, to minimize the problem of battery power dropping below a critical low-end threshold during one or more extended periods of inactivity without notice of the same, the second timer is employed to periodically transmit payload information at longer intervals, for example, once every week. As a result, even if the audience member does not use the video game console for an extended period of time (e.g., one month), then the central office and/or metering entity will still receive an indication of the remaining battery life of each game tag 118 in the household once per week. In the event that one or more of the game tags' battery capacity drops below a threshold value (e.g., a voltage level), then the metering entity may automatically reference the household address associated with the corresponding game tag identification number from a database of tags and send one or more new game tags or batteries to the household.

Returning to FIG. 6, timer $T_1$ and $T_2$ (308) are started (block 602) and the example processor 310 of FIG. 3A monitors the motion sensor 302 for an indication of movement (block 604). The example timer 308 may facilitate any number of independently running timers and/or registers to track one or more time values. Without limitation, the functionality of the example timer 308 may be an integral component of the example processor 310 or one or more separate timing devices. If movement is not detected (block 604), control advances to block 608. If movement is detected (block 604), then an indication of that movement is saved to the memory 306 (block 606). As described above, any number of motion sensors may be employed to detect potential game play of the audience member. These sensor(s) may provide any desired combination of motion data including, but not limited to, an indication of movement (e.g., a TRUE bit), an indication of no-movement (e.g., a FALSE bit), an indication of tilt (e.g., a bit set by a mercury switch (and/or alternative liquid metal switch), an accelerometer, etc.), an indication of orientation change (e.g., a bit set by an electronic compass), and/or magnitude(s) of the movement(s) (e.g., acceleration force(s) measured by a multi-axis accelerometer, etc.).

The processor 310 determines whether timer $T_1$ has elapsed (block 608) and, if so, determines if any indication of movement has occurred within the last time period (i.e., within time period $T_1$) (block 610). If not, then the tag circuit 212 does not need to transmit any payload information and control advances to block 618. If movement has occurred in the last time period of $T_1$ (block 610), then the processor 310 encodes the game tag identification number, the indication(s) of movement and associated time(s) that movement was detected, and an indication of the power supply battery capacity (block 612). The encoded payload information is provided to the transceiver 316 and transmitted to the tag meter 120 via a signal (e.g., an RF signal, an acoustic signal, an optical signal) (block 614). Timer $T_1$ is reset (block 616) and control returns to block 604 to monitor for additional instances of game tag movement.

If the timer $T_1$ has not elapsed (block 608), control advances to block 618 where the example processor 310 determines whether timer $T_2$ has elapsed (block 618). As described above, timer $T_2$ counts to a value relatively greater than timer $T_1$. For example, timer $T_2$ may be set to expire at one-day intervals, multiple-day intervals, week intervals, multi-week intervals, etc. If the timer $T_2$ has not expired, control returns to block 604. At the expiration of the $T_2$ interval, the processor measures a battery capacity of the power supply 312 (block 620), encodes the battery capacity information with the example encoder 314, and transmits the payload information to the tag meter 120 via a signal (e.g., an RF signal, an acoustic signal, an optical signal) (block 622). Timer $T_2$ is reset (block 624) and control returns to block 604 to monitor for instances of game tag movement. Application of $T_1$ and $T_2$ in the manner described in FIG. 6 allows the example tag circuit 212 to be constructed without a need for the receiver 320. Similarly, the application of $T_1$ and $T_2$ in the manner described in FIG. 6 allows the example tag meter 120 to be constructed without any need for the example RF modulator 416, shown in FIG. 4.

FIG. 7 is a flow diagram representative of example machine readable instructions that may be executed to implement the example tag meter 120 of FIG. 4. The example program of FIG. 7 begins at block 702 where the tag meter 120 detects presence information (e.g., determining whether users or audience members are in the vicinity of the game console 104 via the proximity sensors 412) and/or audio signals (e.g., information associated with one or more types of media, such as movies, television programs, commercials, video games, etc.) via the audio sensor 410 for use in identifying the media presented by the monitored device, whether a presentation device (e.g., a television) is on, or whether one or more audience member(s) are registered in, for example, a metering system implementing a personal meter (e.g., a people meter). The presence information and/or any detected audio signals may be stored and included in the payload that is transmitted to the metering entity or, in other examples, may be independently sent to the metering entity. As described above, the tag meter 120 may be set to initiate an exchange of information (e.g., battery health, video game controller movement data, etc.) with the tag circuit 212 and/or may be set to receive a transmission from the tag circuit 212 (e.g., where the tag circuit 212 initiates transmission of a payload when movement is detected by the motion sensor 302) (block 704). As described above, in other examples, the metering entity may initiate a request via the communication interface 414.

Where the tag meter 120 is to initiate exchanges, requests or prompts may be sent (e.g., on a scheduled basis, on a periodic basis, upon receipt of a manual request from the central office, etc.) to the tag circuit 212 for a payload transmission (block 706). A lack of response from the tag circuit 212 (block 708) may indicate, for example, a low battery health or inoperative status associated with the game tag 118, causing the tag meter 120 to transmit replacement request information (e.g., a tag identification number, an address, an account number, etc.) to the metering entity (e.g., central office), as described above. Where a response is received from the tag circuit 212 (block 708), the tag meter proceeds to receive the payload, which may include battery status, movement data (e.g., one or more bits indicating an acceleration, orientation, motion, tilt, magnitude, force, etc.), time information (e.g., time stamps associated with motion events), and/or tag identification numbers. As shown in the example program of FIG. 7, the tag meter 120 may store the payload (e.g., in memory of the processor 408) (block 714) and then transmit the payload to the metering entity (block 716). For instance, the payload may be stored for a period of time before being transmitted to the metering entity or may be stored until the metering entity requests the payload. Additionally or alternatively, the tag meter 120 may analyze the payload (e.g., compare the contents of the payload to a previous payload) to determine a status of the information (e.g., whether the payload includes new information) and, in some examples, may transmit the payload depending on the status.

Returning to block 704, where the tag meter 120 is not set to initiate exchanges, the example program of FIG. 7 may determine if a payload is being transmitted (block 718). For example, the game tag circuit 212 may be configured to transmit a payload to the tag meter 120 every 12 or 24 hours, at which time the tag meter 120 may receive the payload (as described above in connection with block 712). Further, where a payload is not being transmitted (block 718), the tag meter 120 may determine whether a predetermined period of time has elapsed since the transmission of the last payload (block 720). For example, the tag meter 120 may be configured (e.g., by a default or customizable setting) to set a flag indicating an unexpected period of inactivity if the tag circuit 212 has not transmitted a payload (or an indication that no new information is available) during the last 48 or 72 hours. Such a situation may indicate the need for a replacement game tag 118 and/or component thereof, causing the program of FIG. 7 to transmit replacement information to the metering entity (block 710).

Although the above examples describe the tag 118 as being coupled to the wire of a wired controller, the tag could be coupled to the body of the controller in a manner similar to or identical to the manner in which the tag is coupled to a wireless controller.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
    detecting media identifying information corresponding to media presented in an environment including a video game system capable of executing a plurality of video games;
    identifying which of the plurality of video games is being played via a video game controller based on the media identifying information, wherein the video game controller is coupled to a sensor to detect motion data related to movement of the video game controller and to transmit the motion data without affecting operation of the video game system; and
    combining, via a processor, the media identifying information with the motion data received from the sensor.

2. A method as defined in claim 1, further comprising causing the sensor to periodically transmit the motion data.

3. A method as defined in claim 1, wherein detecting the media identifying information comprises capturing an audio signal associated with the video game system.

4. A method as defined in claim 3, wherein detecting the media identifying information comprises collecting an embedded code in the audio signal.

5. A method as defined in claim 3, wherein detecting the media identifying information comprises detecting a signature in the audio signal.

6. A method as defined in claim 1, further comprising detecting a presence of a user in the environment.

7. A method as defined in claim 6, further comprising combining presence data corresponding to detecting of the presence with the media identifying information and the motion data.

8. A method as defined in claim 1, wherein combining the media identifying information and the motion data comprises associating the media identifying information with a message including the motion data to be conveyed to a metering entity.

9. A tangible machine readable storage medium comprising instructions that, when executed, cause a machine to at least:
    detect media identifying information corresponding to media presented in an environment including a video game system capable of executing a plurality of video games;
    identify which of the plurality of video games is being played via a video game controller based on the media identifying information, wherein the video game controller is coupled to a sensor to detect motion data related to movement of the video game controller and to transmit the motion data without affecting operation of the video game system; and
    combine the media identifying information with the motion data received from the sensor.

10. A storage medium as defined in claim 9, wherein the instructions cause the machine to trigger the sensor to periodically transmit the motion data.

11. A storage medium as defined in claim 9, wherein the instructions cause the machine to detect the media identifying information by capturing an audio signal associated with the video game system.

12. A storage medium as defined in claim 11, wherein the instructions cause the machine to detect the media identifying information by collecting an embedded code in the audio signal.

13. A storage medium as defined in claim 11, wherein the instructions cause the machine to detect the media identifying information by detecting a signature in the audio signal.

14. A storage medium as defined in claim 9, wherein the instructions cause the machine to detect a presence of a user in the environment.

15. A storage medium as defined in claim 14, wherein the instructions cause the machine to combine presence data representing the detected presence with the media identifying information and the motion data.

16. A storage medium as defined in claim 9, wherein the instructions cause the machine to combine the media identifying information and the motion data by associating the media identifying information with a message including the motion data to be conveyed to a metering entity.

17. An apparatus comprising:
    a sensor structured to be attached to a video game controller, the sensor structured to be attached external to a housing of the video game controller, the sensor structured to detect a user interaction with the video game controller;
    a processor structured to execute instructions to:
        compare a magnitude of a motion of the video game controller detected by the sensor to a threshold; and
        attribute the motion to video game play if the magnitude of the motion detected by the sensor exceeds the threshold; and
    a transmitter structured to convey a signal representative of the detected user interaction to a meter without affecting operation of a video game system to be controlled by the video game controller.

18. An apparatus as defined in claim 17, wherein the processor, when executing instructions, is structured to attribute the motion to non-video game play if the magnitude is less than the threshold.

19. An apparatus as defined in claim 17, wherein the processor, when executing instructions, is structured to associate the user interaction with an identifier assigned to the sensor.

20. An apparatus as defined in claim 17, further comprising a filter structured to determine if the motion corresponds to haptic feedback implemented by the video game controller.

21. An apparatus as defined in claim 20, wherein the haptic feedback is provided in response to an aspect of a video game being played via the video game controller.

22. An apparatus as defined in claim 17, wherein the sensor is carried by an annular housing removably attachable to a wire of the video game controller.

* * * * *